United States Patent
Menheere (10) Patent No.: US 11,529,705 B1
(45) Date of Patent: Dec. 20, 2022

(54) TORQUE TRANSFER COUPLING AND TOOL FOR ASSEMBLY THEREOF

(71) Applicant: PRATT & WHITNEY CANADA CORP., Longueuil (CA)

(72) Inventor: David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/337,023

(22) Filed: Jun. 2, 2021

(51) Int. Cl.
*B23P 19/04* (2006.01)
*F02C 7/36* (2006.01)

(52) U.S. Cl.
CPC ............... *B23P 19/04* (2013.01); *F02C 7/36* (2013.01); *F05D 2230/60* (2013.01); *F05D 2230/68* (2013.01)

(58) Field of Classification Search
CPC .... F01D 25/28; F01D 25/285; F05D 2230/64; F05D 2230/644; F05D 2230/68; F05D 2230/60; B23P 19/04; B23P 19/10; B23P 19/12
See application file for complete search history.

(56) References Cited

U.S. PATENT DOCUMENTS

| 2,970,019 | A | 9/1958 | Brown et al. |
| 3,712,434 | A | 1/1973 | Anderson et al. |
| 10,837,496 | B2 | 11/2020 | Kowalewski et al. |
| 2020/0230754 | A1* | 7/2020 | Gastal .................... F01D 5/025 |

* cited by examiner

*Primary Examiner* — Christopher J Besler
(74) *Attorney, Agent, or Firm* — Norton Rose Fulbright Canada LLP.

(57) ABSTRACT

A tool for installing segments of a coupling having male and female couplers drivingly engaged to one another by the segments, the tool has: a coupler-engaging section engageable to the a female coupler of the couplers for radially supporting the tool relative to the female coupler about a rotation axis of the coupling; and a peripheral wall secured to the coupler-engaging section and extending circumferentially around the rotation axis, a diameter (D2) of the peripheral wall selected to allow insertion of the segments between the female coupler and the peripheral wall, the peripheral wall defining an abutting surface against which radially inner ends of the segments abut during insertion of the segments between the female coupler and the peripheral wall.

11 Claims, 5 Drawing Sheets

TORQUE TRANSFER COUPLING AND TOOL FOR ASSEMBLY THEREOF

TECHNICAL FIELD

The application relates generally to aircraft engines, such as gas turbine engines, and, more particularly, to systems and methods used to transfer torque between two components of said engines.

BACKGROUND OF THE ART

Couplings are used in a wide variety of applications to transfer torque from one rotary component (such as a shaft) of one piece of equipment to a rotary component of another. Common considerations in coupling design include achieving satisfactory dynamic stress resistance and low friction in operating conditions varying across the operation envelope, as well as limiting costs. In aeronautic applications, minimizing weight is also typically a significant design consideration. The individual pieces of equipment can be manufactured separately. Many couplings require to align the axes of the two rotary components within a certain degree of tolerance, to a point which can be difficult or challenging to achieve in practice, and increasing the degree of tolerance to misalignment has represented significant trade-offs or sacrifices on at least some of the design considerations. There always remains room for improvement, such as addressing misalignment tolerance considerations.

SUMMARY

A tool for installing segments of a coupling having couplers drivingly engaged to one another by the segments, the tool comprising: a coupler-engaging section engageable to a female coupler of the couplers for radially supporting the tool relative to the female coupler about a rotation axis of the coupling; and a peripheral wall secured to the coupler-engaging section and extending circumferentially around the rotation axis, a diameter (D2) of the peripheral wall selected to allow insertion of the segments between the female coupler and the peripheral wall, the peripheral wall defining an abutting surface against which radially inner ends of the segments abut during insertion of the segments between the female coupler and the peripheral wall.

In some embodiments, the diameter (D2) of the peripheral wall is greater than a diameter (D1) of a peripheral wall of the female coupler minus two times a length of the segments defined between opposed radial ends of the segments such that the radially inner ends of the segments are circumferentially offset from radially outer ends of the segments.

In some embodiments, the coupler-engaging section defines a cylindrical member receivable within a central bore of the female coupler.

In some embodiments, the peripheral wall defines a plurality of sockets distributed circumferentially around the rotation axis, the plurality of sockets sized to accept the radially inner ends of the segments.

In some embodiments, a handle protrudes from the peripheral wall and away from the coupler-engaging section.

In some embodiments, the tool is made of a material having a hardness being less than that of a material of the female coupler.

In some embodiments, the coupler-engaging section is sized to be engaged to the female coupler via an intermediary component.

In some embodiments, the intermediary component is an anti-rotation nut secured to the female coupler, the coupler-engaging section is sized to be received within a bore defined through the anti-rotation nut.

In another aspect, there is provided a kit comprising the tool as described above; and the segments.

In yet another aspect, there is provided a method of assembling a coupling having a female coupler, a male coupler, and segments for engaging the female coupler to the male coupler, comprising: engaging a tool inside the female coupler to radially support the tool relative to the female coupler; inserting the segments between a peripheral wall of the female coupler and the tool, the tool radially supporting inner ends of the segments; and removing the tool and engaging the male coupler to the segments.

In some embodiments, the engaging of the tool includes inserting a coupler-engaging section of the tool inside a bore of the female coupler.

In some embodiments, the inserting of the segments between the peripheral wall of the female coupler and the tool includes inserting the segments between the peripheral wall and the tool having a diameter (D2) greater than a diameter (D1) of the peripheral wall of the female coupler minus two times a length of the segments defined between opposed radial ends of the segments.

In some embodiments, the inserting of the segments includes angling the segments such that the segments are non-parallel relative to a radial direction relative to a rotation axis of the coupling.

In some embodiments, the inserting of the segments includes sliding the inner ends of the segments into correspondingly shaped sockets defined by the tool.

In some embodiments, the tool is rotated until a first segment of the segments is receivable within first connections of the female coupler and within a first socket of the sockets of the tools.

In some embodiments, the rotating of the tool includes rotating the tool after the tool is engaged inside the female coupler.

In some embodiments, the inserting of the segments includes inserting retaining tabs of the segments within gaps defined between the peripheral wall of the female coupler and a retaining ring.

In some embodiments, the removing of the tool includes pulling on the tool in an axial direction relative to a rotation axis of the coupling.

In some embodiments, the segments is radially locked relative to the female coupler before the removing of the tool.

In some embodiments, the radially locking of the segments includes radially locking the segments with a retaining ring abutting retaining tabs of the segments.

DESCRIPTION OF THE DRAWINGS

Reference is now made to the accompanying figures in which.

DETAILED DESCRIPTION

Figure 1:
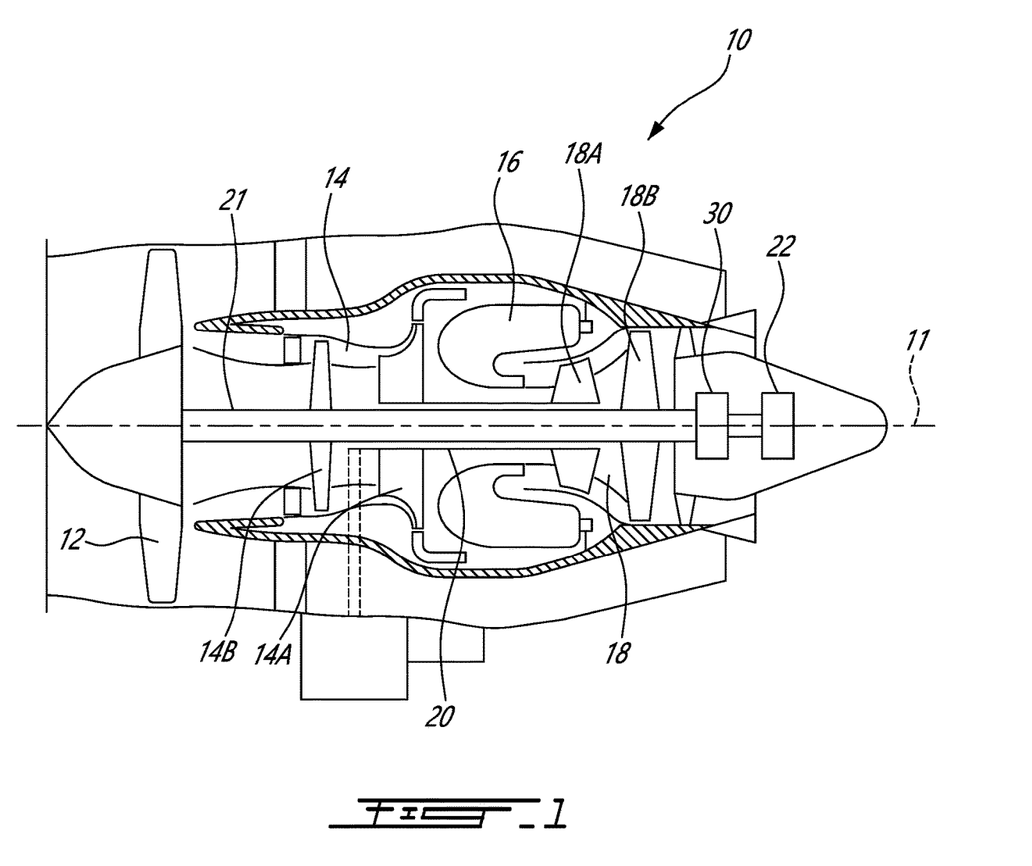
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

In the embodiment shown, the low-pressure shaft 21 is drivingly engaged to an accessory 22. The accessory may be, for instance, a generator, a gearbox, a pump, and so on. In the present case, a coupling 30 is used to transmit a rotational input from the low-pressure shaft 21 to the accessory 22. The coupling 30 may allow the removal of the accessory 22, either for maintenance or for substitution for another accessory. The coupling 30 is further described in U.S. patent application Ser. No. 17/022,203 filed on Sep. 16, 2020, the entire contents of which are incorporated herein by reference in their entirety.

Figure 2:
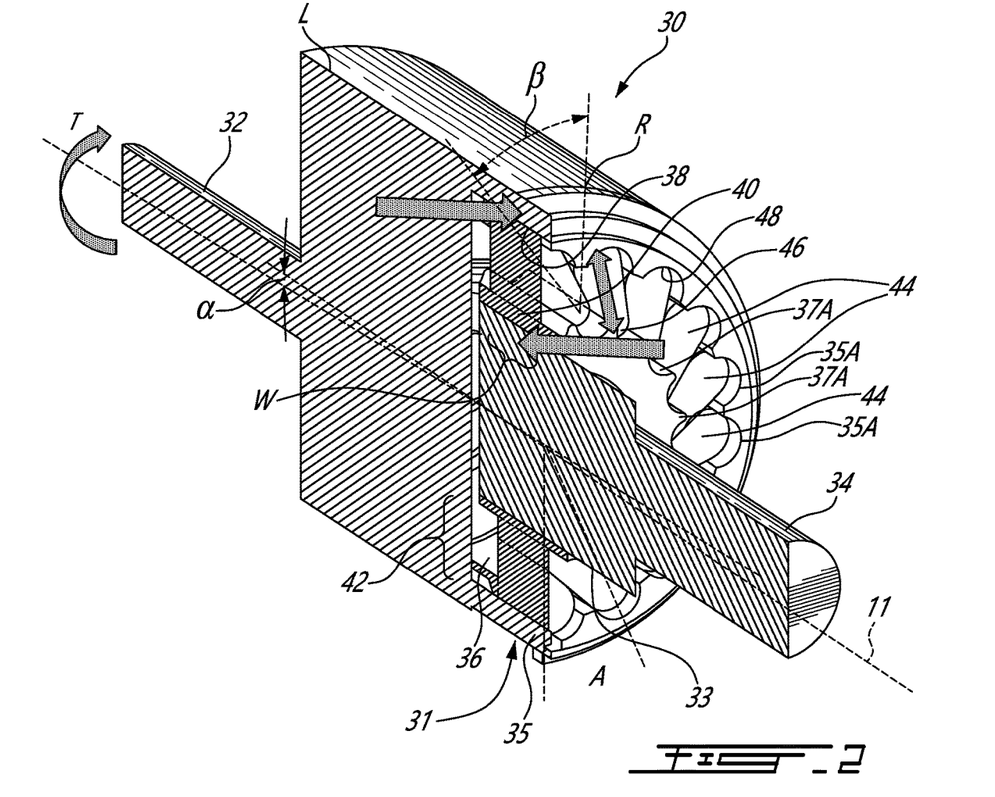
FIG. 2 is a three dimensional cutaway view of a coupling for the gas turbine engine of FIG. 1.
Figure 3:
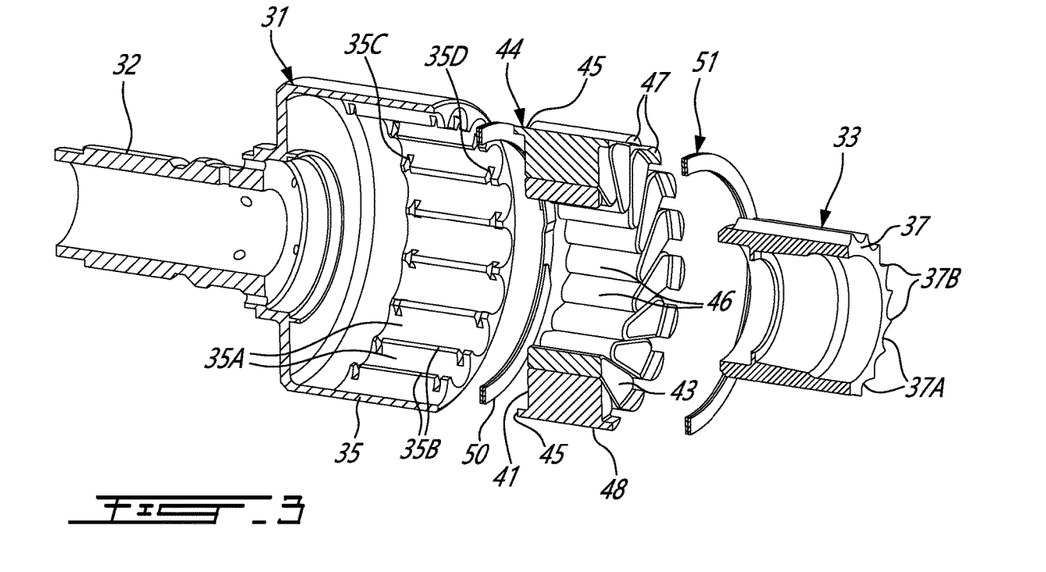
FIG. 3 is a three dimensional cutaway exploded view of the coupling of FIG. 2.

Referring to FIGS. 2-3, the coupling 30 is described in more details. In the embodiment shown, the coupling 30 has two rotary members 32, 34, presented here in the form of shafts, and is used generally for the function of transferring torque from one of the rotary members 32 to the other 34. Each of the two rotary members 32, 34 is connected to a respective one of a female coupler 31 and a male coupler 33. There can be some degree of misalignment (e.g. angle α) which may need to be accommodated between the axes of these rotary members 32, 34. The rotary member 32 may be drivingly engaged to the low-pressure shaft 21 via a spline coupling. Other couplings are contemplated. In some embodiments, the rotary member 32 may be made monolithic with the low-pressure shaft 21.

In the embodiment shown, the female coupler 31 defines a recess 36 that is circumscribed by a peripheral wall 35 extending around a rotation axis of the coupling 30, which, in the present case, corresponds to the central axis 11. The rotation axis may be different than the central axis 11 in some embodiments. The peripheral wall 35 forms a radially inner-facing surface that will be referred to herein as more concisely as the inner face 38. The male coupler 33 has a peripheral wall 37 extending around the rotation axis 11. The peripheral wall 37 forms a radially outer-facing surface, or outer face 40, that is received into the recess 36. The outer face 40 has a smaller diameter than the inner face 38, and a spacing 42 is present between the inner face 38 and the outer face 40. The peripheral wall 35 of the female coupler 31 defines a plurality of connections 35A. The peripheral wall 37 of the male coupler 33 defines a plurality of connections 37A. In the present embodiment, these connections 35A, 37A are sockets having a substantially cylindrical shape and are interspaced with ridges or crests 35B, 37B. Other shapes are contemplated.

A plurality of circumferentially arranged links or segments 44 occupy the spacing 42. Each segments 44 has an radially inner end 46 connected to the inner face 38, and an radially outer end 48 connected to the outer face 40. The inner end 46 is engaged to a respective one of the connections 37A of the peripheral wall 37 of the male coupler 33. The outer end 48 is engaged to a respective one of the connections 35A of the peripheral wall 35 of the female coupler 31. A shape of the radially inner end 46 and of the radially outer end 48 are selected to matingly engage the connections 35A, 37A. The connections 35A, 37A are used to prevent the radially inner end 46 and the radially outer end 48 from circumferentially sliding along the inner face 38 and the outer face 40 they are connected to, and thereby fix the relative circumferential position between the inner end 46 and the outer end 48. The connection can be pivotal, rigid, or pivotal with a partial rigidity. Different types of connections can be used in different embodiments. Depending of the exact choice of connection type, the segment-receiving connections formed in the inner face and the outer face can involve a corresponding form of irregularity in the surface geometry. The irregularity can be in the form of a seat such as a protrusion, recess, or other shape complementary to the shape of the corresponding end, or in the form of a slot or hole to receive a pivot pin, to name some possible examples. The segments extend obliquely, in the sense that the general orientation L of their length between the inner end 46 and the outer end 48 is inclined, or slanted, e.g. by angle β, from the radial orientation R. In other words, the outer end of each segment is circumferentially offset from the segment's inner end by an arc A. In other the radially inner end 46 is circumferentially offset from the radially outer end 48 relative to the rotation axis A1.

In the embodiment shown, the segments 44 are pivotally engaged within their connections 35A, 37A. The pivotal connections may be provided via engagement between rounded ends of the segments 44 and the matching connections 35A, 37A in the form of rounded sockets in the inner face 38 and the outer face 40. In an alternate embodiment, for instance, the pivotal connection can be achieved via an axially protruding pin in each one of the ends, and a corresponding slot to receive the pin tips on both axial sides of the segment, for instance. In still another embodiment, the connections can be provided in the form of rounded protrusions formed in the corresponding one, or both, of the inner face and the outer face, and a rounded recess of a matching shape can be formed in the corresponding end or ends of the segment, thereby inversing the male/female roles, to name another possible example.

In some embodiments, connections which allow for pivoting of the segments around one or both ends can be preferred, whereas in other embodiments, non-pivotal, or partially pivoting connections which cause bending deformation in the segment in addition to compressive stress may be preferred. The connections which are part of the male member may be referred to as the male member connections and the connections which are part of the female member can be referred to as the female member connections for simplicity.

The segments 44 are configured to work in compression during torque-transfer operation, and transfer torque by a combination of their compression stress (there can also be some degree of bending stress if the connection is not purely pivotal) and of their inclination/obliqueness β. In an embodiment where the female coupler 31 is the driving member, the inner end 46 of each segments 44 will be circumferentially offset from the outer end 48 in the direction of the torque T, which results in compressing the segments 44. In an alternate embodiment where the male coupler 33 is the driving member, the outer ends 48 of the segments 44 would instead be circumferentially offset from the inner ends 46 in the direction of application of the torque T, which would also result in compressing the segments during torque transfer. Accordingly, the direction in which the inner ends 46 are circumferentially offset from the outer ends 48 may be selected as a function of the orientation of the torque T, and of whether the female coupler 31 or the male coupler 33 is the driving member, with the goal of subjecting the segments to compression during torque transfer.

The segments 44 may be configured in a manner to operate collectively, but as independent bodies from the point of view of stress gradients. The segments 44 may be separate individual components, mechanically connected to one another only indirectly, via the male coupler 33 and the female coupler 31. By operating partially or fully in compression, and by being shaped and sized appropriately, they may each independently transfer a portion of the torque, without individually imparting shear or tensile stress into an adjacent segment. They may be relatively slender (i.e. thin in the orientation normal to their length in a transverse plane), which can allow them to elastically deform to a greater extend than, thicker components, or than a component forming a full annulus. This may contribute in accommodating a satisfactory degree of axial misalignment a between the male coupler 33 and the female coupler 31. Moreover, the segments 44 can have an axial dimension, referred to herein as width W, which is significant relative to their length, such as in the same order of magnitude, similar or greater dimensions, to spread the compressive force along the width W. Spreading a given amount of compressive force (stemming from a given amount of torque T) along a greater width W, can limit the compressive force density, and allow a greater amount of torsion between the two axially opposite sides. In some embodiments, the torsion deformation capability of the segments can be harnessed to accommodate misalignment. In yet some other embodiments, it can be preferred to segment the segments into two or more components along their axial length, allowing the individual components to work independently from another, without transmitting torsion stress from one component of the segment to the adjacent other one. The width W can be significantly greater than the thickness, for instance. The coupling 30 can be designed in a manner for the full width to remain in contact with both of the female coupler 31 and the male coupler 33 due to deformation. The segments 44 can accommodate misalignment by deformation rather than by displacement relative to the members, which can be favorable from the point of view of wear resistance. In other embodiments it can be preferred to reduce the width W as much as possible in a manner to reduce weight, for instance.

In some embodiments, an even greater degree of axial misalignment may be accommodated by selecting, for the material of the segments 44, a material having a Young's modulus significantly lower than the Young's modulus of the material forming the female coupler 31 and the male coupler 33. For instance, in a scenario where the female coupler 31 and the male coupler 33 are made of steel, the segments can be made of a suitable plastic. A plastic material with greater viscoelastic behavior can be preferred to accommodate rapid overload, but may be less performant in terms of recovery factor at slower loading rates. Polyimide plastic materials such as Vespel™ may be an interesting candidate due to features such as heat resistance, and can have a Young's modulus two degrees or magnitude lower (~100 times lower) than the Young's modulus of steel. Depending on the embodiment, other materials can be selected, such as other plastics, structured materials like metal foams, aerogels, and 3D-printed un-isotropic metal lattices which provide a low apparent Young modulus and even be more suitable at higher temperature environments. Similarly, lower cost materials than Vespel™ may be preferred in lower temperature environments.

Another potential reason for selecting a different material for the segments than for the male and female members is that it may be preferred for the material of the segment to have a greater coefficient of thermal expansion than the coefficient of thermal expansion of the male and female members. Indeed, in cases where the typical operation temperature range of the coupling is significantly above ambient temperature/standard atmospheric conditions, having a greater coefficient of thermal expansion can simplify assembly. Indeed, the length of the segments can be designed to be shorter that the distance between the members which they are designed to occupy during operation conditions. Accordingly, the segments can be inserted easily into the spacing, with some degree of play allowed at, say, 20° C., and be designed to grow and extend as the temperature rises during normal operation, in a manner to stabilize in an equilibrium configuration where the combination of thermal growth and deformation from mechanical stress lead to maintaining a given design slant angle β at a given set of conditions of torque and temperature, and depart from this target slant angle within set tolerances as the torque and temperature vary within the operation envelope. Similarly, and the thermal "shrinking" can be harnessed at disassembly, to avoid the phenomena of worn parts becoming "hooked" on others, especially in blind assemblies.

The slant angle β can also affect the density of the compressive stress. In one embodiment, it can be preferred to optimize the slant angle β in a manner to minimize compressive stress density. In a scenario where it is also preferred to limit backlash to within 2 degrees, it can be preferred to select a slant angle of between 52 and 60 degrees measured from the outer pitch diameter tangent, with the range of between 54 and 58 degrees being more preferred in some embodiments. The ideal slant angle can be of 55 degrees in one embodiment, for instance. In other words, the angle β can be of between 30 and 38 degrees, preferably between 32 and 36, and ideally of about 35 degrees.

Referring more particularly to FIG. 3, in the embodiment shown, the segments 44 extend between a first axial end face 41 at a first axial end and a second axial end face 43 at a second axial end and opposite the first axial end face 41. Each of the segments 44 includes each a first tab 45 axially protruding from the first axial end face 41 and away form the second axial end face 43, and a second tab 47 axially protruding from the second axial end face 43 and away from the first axial end face 41. The first tab 45 and the second tab 47 are engaged by a first retaining ring 50 and by a second retaining ring 51 of the female coupler 31, respectively. The first tab 45 and the second tab 47 may be off-centered relative to a mid-plane intersecting both of inner ends 46 and outer ends 48 of the segments 44 and intersecting the first axial end face 41 and the second axial end face 43. In other words, the segment 44 may be non-symmetric.

The peripheral wall 35 of the female coupler 31 defines notches. Namely, each of the crests 35B defines a first notch 35C and a second notch 35D axially spaced apart form the first notch 35C relative to the rotation axis A1. The first notch 35C is sized to receive the first retaining ring 50. The second notch 35D is sized to receive the second retaining ring 52. The first tab 45 is disposed radially between the first retaining ring 50 and the peripheral wall 35 of the female coupler 31. The second tab 47 is disposed radially between the second retaining ring 51 and the peripheral wall 35 of the female coupler 31. The first retaining ring 50 and the second retaining ring 51 bias the first tab 45 and the second tab 47 radially outwardly against the peripheral wall 35 and are used to maintain the segments 44 in engagement within their connections 35A.

Figure 4:
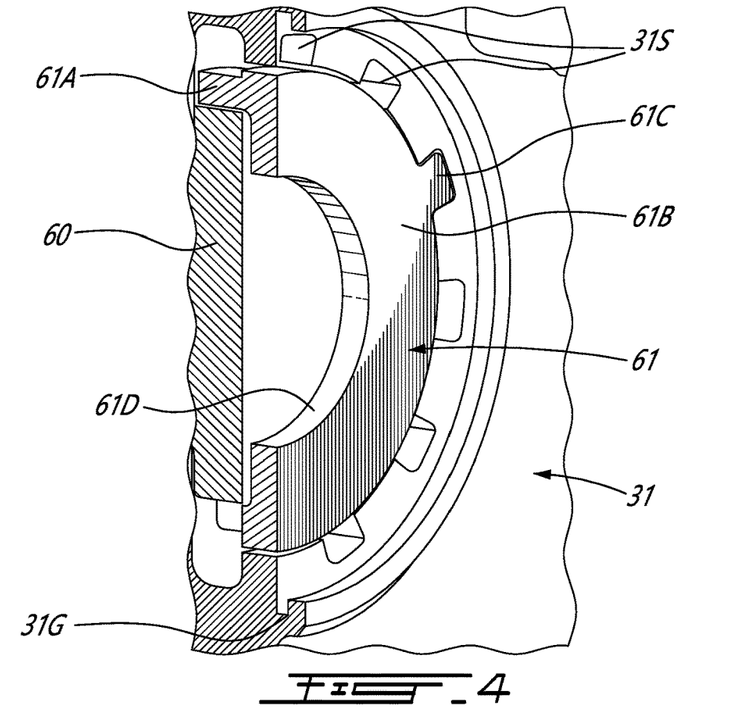
FIG. 4 is a three dimensional view of a portion of the coupling of FIG. 2.

Referring now to FIG. 4, in the embodiment shown, the female coupler 31 may be splined to the low-pressure shaft 21 and retained engaged to the low-pressure shaft 21 via a bolt 60. A threading engagement may be defined between the female coupler 31 and the bolt 60. To prevent the bolt 60 from unthreading, an anti-rotation nut 61 is engaged to both of the bolt 60 and the female coupler 31. The anti-rotation nut 61 has a first section 61A received radially between the female coupler 31 and the bolt 60 and a second section 61B that axially abuts against the bolt 60. The second section 61B defines one or more locking tab(s) 61C that is axially received within a correspondingly shaped slot 31S defined by the female coupler 31. Hence, the anti-rotation nut 61 is non-rotatable relative to the female coupler 31. The female coupler 31 defines an annular groove 31G sized to accept a snap ring (not shown) to axially lock the anti-rotation nut 61 to the female coupler 31. The anti-rotation nut 61 defines a bore 61D.

In some cases, for instance when the central axis 11 of the gas turbine engine 10 is substantially parallel to a ground, it may be difficult to insert the segments 44 without them falling down by gravity. A tool 70 is being described herein and may be used to assemble the segments 44 during an assembly process. The tool 70 described below may at least partially alleviate these drawbacks.

Figure 5:
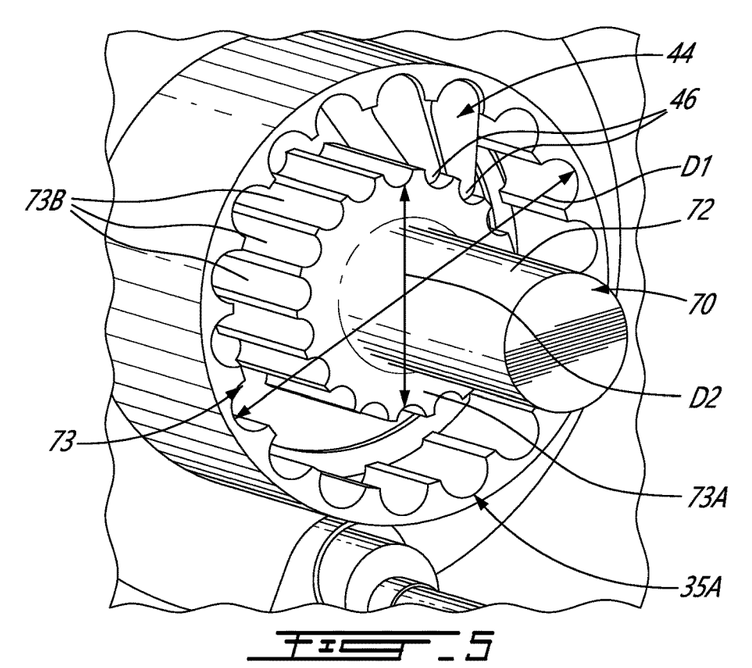
FIG. 5 is a three dimensional view illustrating a female coupler of the coupling with a tool used for assembling segments of the coupling of FIG. 2.
Figure 6:
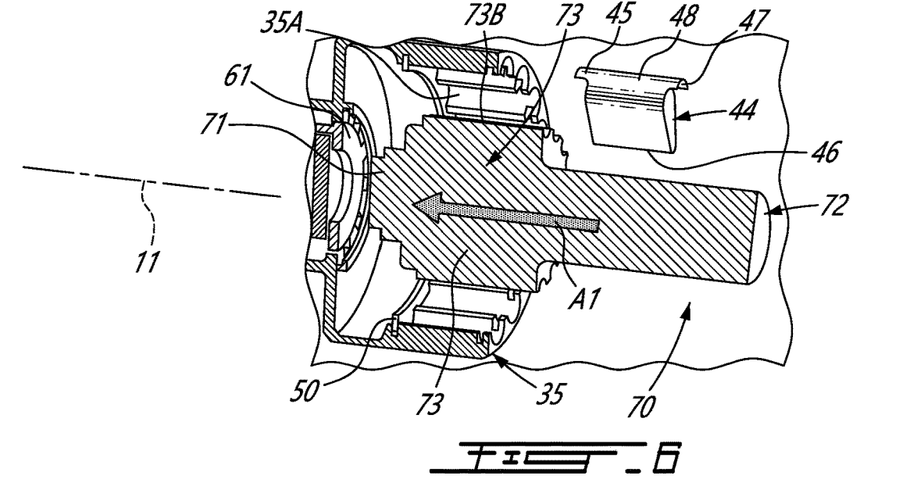
FIGS. 6-8 are three dimensional cutaway views illustrating steps of assembling the coupling of FIG. 2 with the tool of FIG. 5.

Referring now to FIGS. 5-6, the tool 70 has a fore section 71, also referred to as a coupler-engaging section, that is used for securing the tool 70 to the female coupler 31. In the embodiment shown, the fore section 71 is cylindrically shaped and is sized to be received within the bore 61D of the anti-rotation nut 61. Peripheral walls of the fore section 71 and of the bore 61D may contact each other such that the tool 70 may remain substantially immobile relative to the female coupler 31 by itself thanks to the cooperation of the fore section 71 and the bore 61D. A tight fit may be provided therebetween. It will be appreciated that the tool 70 may include any suitable means for supporting the tool relative to the female coupler 31 about a rotation axis of the coupling 30 without departing from the scope of the present disclosure. For instance, the tool may define one or more prongs receivable within the slots 31S of the female coupler 31, a shaft section receivable within an aperture of the female coupler 31 or within a hollow passage of a shaft to which the female coupler 31 is engaged. In some cases, the tool may engage an outer face of the female coupler 31.

In the embodiment shown, the tool 70 includes a handle 72 via which a user can manipulate the tool to insert the fore section 71 inside the female coupler 31. The fore section 71 and the handle 72 are located at opposite side of a central section 73 of the tool 70. In the depicted embodiment, the central section 73 is sized to axially overlap the peripheral wall 35 of the female coupler 31. The central section 73 has a peripheral wall 73A that defines connections 73B, shown as sockets, that have shapes that substantially correspond to the shape of the connections 37A defined by the peripheral wall 37 of the male coupler 33. Hence, the tool 70 is used to simulate the presence of the male coupler 33 to ease assembly of the segments 44.

The peripheral wall 73A of the tool 70 is therefore used as an abutting surface against which the radially inner ends 46 rest after their outer ends 48 they have been inserted into the connections 35A of the peripheral wall 35 of the female coupler 31. In one variant, the central section 73 of the tool 70 may be a cylinder against which the inner ends 46 of the segments 44 rest. In other words, the central section 73 of the tool 70 need not define sockets or connections.

As shown in FIG. 5, in the embodiment shown, to properly angle the segments 44 for subsequent insertion of the male coupler 33, a diameter D2 of the peripheral wall 73A of the central section 73 of the tool 70 is greater than a diameter D1 of the peripheral wall 35 of the female coupler 31 minus two times a length of the segments 44. This may ensure that the segments 44 are non-parallel to a radial direction relative to the central axis 11 and that the outer ends 48 of the segments are circumferentially offset form the inner ends 46 of the segments 44 when they are inserted in to the connections 35A of the female coupler 31. In other words, this diameter D2 of the peripheral wall 73A of the tool 70 may be selected such that the segments 44 have the desired angle that they will have when the male coupler 33 is engaged to the segments 44. The length of the segments 44 extends from their inner ends 46 to their outer ends 48. It will be appreciated that the diameters D1 and D2 are taken from deepest most locations of the connections or sockets. In other words, the diameters D1, D2 do not extend from the crests that bound the sockets, but extends from locations between the crests.

The tool 70 may be made of a material having a hardness being less than that of a material of the female coupler 31. For instance, the female coupler 31 may be made of a metallic material whereas the tool 70, or at least the peripheral wall 73A of the tool 70, may be made of plastic or any other suitable material sufficiently soft to avoid damaging the female coupler 31. Different parts of the tool 70 (e.g., fore section 71, handle 72, and central section 73) may be made of different material.

Figure 7:
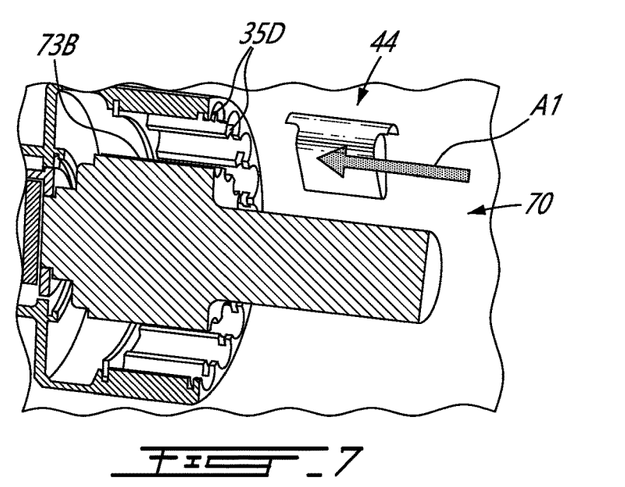
Figure 8:
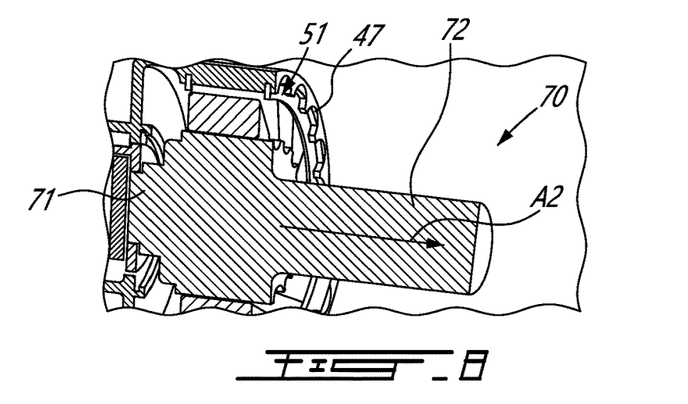

Referring now to FIGS. 6-8, the steps used to assemble the couplings 30 are illustrated. As shown in FIG. 6, the tool 70 is engaged to the female coupler 31 to radially support the tool relative to the female coupler 31. As explained above, this may be done by moving the tool 70 along a first axial direction A1 relative to the central axis 11 and relative to the female coupler 31. In the embodiment shown, the tool 70 is supported by the fore section 71 being received into the bore 61D defined by the anti-rotation nut 61. But, other means of radially supporting the tool 70 relative to the female coupler 31 are contemplated as explained above. Moreover, the tool 70 need not be directly engaged to the female coupler 31 and may be engaged to the female coupler 31 via an intermediary component, such as the anti-rotation nut 61 in the present embodiment.

As shown in FIG. 7, once the tool 70 is in place, the segments 44 may be inserted into the connections 35A of the female coupler 31. The segments 44 may be moved in the first axial direction A1 relative to the female coupler 31 to insert the outer ends 48 into the connections 35A. In the present case, the inner ends 46 are inserted into the connections 73B that are defined by the central section 73 of the tool 70. Because the length of the segments 44 between their inner ends 46 and outer ends 48 is greater than a distance along a radial direction relative to the central axis 11 between the tool 70 and the peripheral wall 35 of the female coupler 31, the segments 44 may be angled to be non-parallel to the radial direction before being slid into the connections 35A of the female coupler 31 and into the connections 73B of the tool 70. As explained above, the tool 70 need not define the connections 73B and may define a cylindrical surface against which the inner ends 46 of the segments 44 may abut.

The first retaining ring 50 may be inserted into the corresponding notches defined by the peripheral wall 35 of the female coupler 31 before the tool 70 is engaged to the female coupler 31. Hence, when the segments 44 are inserted into the connections 35A, they may be inserted until the first tabs 45 of the segments 44 are received radially between the peripheral wall 35 of the female coupler 31 and the first retaining ring 50.

As shown in FIG. 8, once all of the segments 44 are in place within the connections 35A of the female coupler 31, the tool 70 may be disengaged. This may be done by moving the tool 70 along a second axial direction A2 being opposed to the first axial direction A1. In the present case, the second retaining ring 51 is inserted into the corresponding notches defined by the peripheral wall 35 of the female coupler 31 before the tool 70 is removed. However, in some cases, once all of the segments 44 have been inserted into the connections 35A, they may cooperate with one another to radially maintain themselves radially relative to the female coupler 31. Hence, in some cases, it may be possible to install the second retaining ring 51 after the tool 30 has been removed. In some cases, it may be possible to install a given number (e.g. half) of the segments and then remove the tool 30. The segments installed may cooperate with one another to radially support one another.

Figure 9:
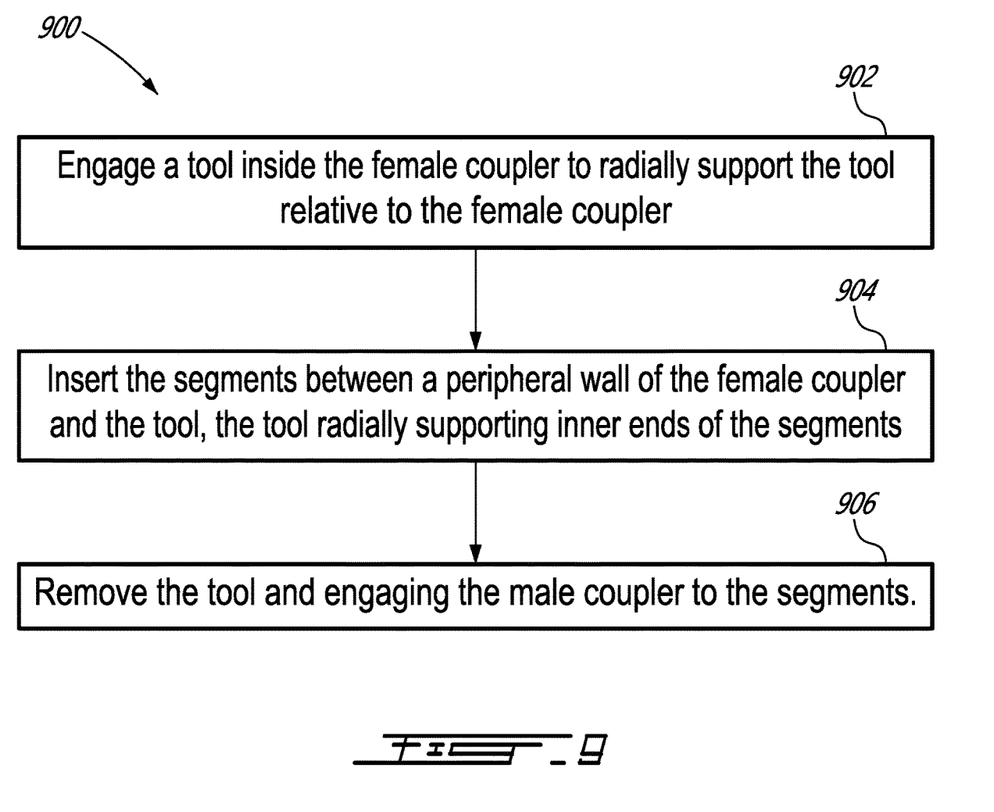
FIG. 9 is a flow chart illustrating steps of assembling the coupling of FIG. 2.

Referring now to FIG. 9, a process of assembling the coupling 30 is shown at 900. The tool 70 is engaged inside the female coupler 31 to radially support the tool 70 relative to the female coupler 31 at 904. The segments 44 are inserted between the peripheral wall 35 of the female coupler 31 and the tool 70 at 904. As shown, the tool radially supports the inner ends 46 of the segments 44. The tool 70 is removed and the male coupler 33 is engaged to the segments 44 at 906.

In the embodiment shown, the engaging of the tool at 902 includes inserting the fore section 71 of the tool 70 inside the bore of the female coupler 31. In the present case, this bore is defined by the anti-rotation nut 61 of the female coupler 31. As illustrated in FIG. 5, the inserting of the segments 44 between the peripheral wall 35 of the female coupler 31 and the tool 70 at 904 includes inserting the segments 44 between the peripheral wall 35 and the tool 70 having the diameter D2 greater than the diameter D1 of the peripheral wall 35 of the female coupler 31 minus two times a length of the segments 44 defined between the inner ends 46 and the outer ends 48 of the segments 44. In some cases, the inserting of the segments at 904 may include angling the segments 44 such that the segments 44 are non-parallel relative to a radial direction relative to a rotation axis of the coupling 30, which corresponds here to the central axis 11 of the gas turbine engine 10. The inserting of the segments 44 at 904 may include sliding the inner ends 46 of the segments 44 into the sockets or connections 73B defined by the tool 70. Alternatively, the inner ends 46 of the segments 44 may be abutted against a cylindrical face of the tool. However, inserting the inner ends 46 of the segments 44 in the sockets that have shapes substantially matching a shape of the connections of the male coupler 33 may facilitate the assembly of the male coupler 33 at 906.

The tool 70 may be rotated about the rotation axis until a first segment of the segments 44 is receivable within the connections 35A of the female coupler 31 and within a first socket or connection 73B of the connections 73B of the tools 70. The tool 70 may be rotated after the tool 70 is engaged inside the female coupler 31.

As depicted in FIGS. 3 and 7, the inserting of the segments 44 includes inserting the first tabs 45 of the segments 44 within gaps defined between the peripheral wall 35 of the female coupler 31 and the first retaining ring 50.

As shown in FIG. 8, the removing of the tool at 906 may include pulling on the tool in the second axial direction A2. The segments 44 may be radially locked relative to the female coupler 31 either before or after the removing of the tool 70. In the present case, the segments 44 are radially locked before the tool is removed. Radially locking the segments 44 may include locking the segments 44 with the second retaining ring 51 abutting the second tabs 47 of the segments 44.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of assembling a coupling having a female coupler, a male coupler, and segments for engaging the female coupler to the male coupler, comprising:
   engaging a tool inside the female coupler to radially support the tool relative to the female coupler;
   inserting the segments between a peripheral wall of the female coupler and the tool, the tool radially supporting inner ends of the segments; and
   removing the tool and engaging the male coupler to the segments.

2. The method of claim 1, wherein the engaging of the tool includes inserting a coupler-engaging section of the tool inside a bore of the female coupler.

3. The method of claim 1, wherein the inserting of the segments between the peripheral wall of the female coupler and the tool includes inserting the segments between the peripheral wall and the tool having a diameter (D2) greater than a diameter (D1) of the peripheral wall of the female coupler minus two times a length of the segments defined between opposed radial ends of the segments.

4. The method of claim 3, wherein the inserting of the segments includes angling the segments such that the segments are non-parallel relative to a radial direction relative to a rotation axis of the coupling.

5. The method of claim 4, wherein the inserting of the segments includes sliding the inner ends of the segments into correspondingly shaped sockets defined by the tool.

6. The method of claim 5, comprising rotating the tool until a first segment of the segments is receivable within a first connection of the female coupler and within a first socket of the sockets of the tool.

7. The method of claim 6, wherein the rotating of the tool includes rotating the tool after the tool is engaged inside the female coupler.

8. The method of claim 6, wherein the inserting of the segments includes inserting retaining tabs of the segments within gaps defined between the peripheral wall of the female coupler and a retaining ring.

9. The method of claim 1, wherein the removing of the tool includes pulling on the tool in an axial direction relative to a rotation axis of the coupling.

10. The method of claim 1, comprising radially locking the segments relative to the female coupler before the removing of the tool.

11. The method of claim 10, wherein the radially locking of the segments includes radially locking the segments with a retaining ring abutting retaining tabs of the segments.

\* \* \* \* \*